US007870922B2

(12) United States Patent
McVicar et al.

(10) Patent No.: US 7,870,922 B2
(45) Date of Patent: Jan. 18, 2011

(54) FORKLIFT TRUCKS

(75) Inventors: Martin McVicar, Emyvale (IE); Robert Moffett, Clontibret (IE); Meredith Hall, Newbliss (IE); Mark Whyte, Castleblayney (IE)

(73) Assignee: Moffett Research & Development Limited, Clontibret (IE)

( * ) Notice: Subject to any disclaimer, the term of this patent is extended or adjusted under 35 U.S.C. 154(b) by 0 days.

(21) Appl. No.: 12/303,146

(22) PCT Filed: Jun. 2, 2006

(86) PCT No.: PCT/IE2006/000061

§ 371 (c)(1),
(2), (4) Date: Dec. 2, 2008

(87) PCT Pub. No.: WO2007/141771

PCT Pub. Date: Dec. 13, 2007

(65) Prior Publication Data

US 2009/0145697 A1 Jun. 11, 2009

(51) Int. Cl.
*B62D 61/12* (2006.01)

(52) U.S. Cl. ........................ 180/209; 180/208; 180/210; 180/211; 180/213; 180/253; 187/222; 280/638; 414/462; 414/467

(58) Field of Classification Search ................. 180/210, 180/211, 213, 214, 208, 209, 15, 199, 252, 180/253; 187/222; 280/9, 11, 43.16, 638, 280/763.1, 137.5, 43, 16; 414/462, 467, 414/631; 415/631
See application file for complete search history.

(56) References Cited

U.S. PATENT DOCUMENTS

| | | | | | |
|---|---|---|---|---|---|
| 2,320,601 | A | * | 6/1943 | Howell | 414/631 |
| 3,004,619 | A | * | 10/1961 | Straussler | 180/208 |
| 3,242,896 | A | * | 3/1966 | Kauffmann | 440/12.69 |
| 4,859,133 | A | * | 8/1989 | Maria | 414/462 |
| 5,217,342 | A | * | 6/1993 | Grether | 414/635 |
| 5,409,346 | A | * | 4/1995 | Grether | 414/631 |
| 5,482,141 | A | | 1/1996 | Wilson | |
| 5,641,261 | A | * | 6/1997 | Talbert et al. | 414/544 |
| 5,651,658 | A | * | 7/1997 | Holmes et al. | 414/635 |
| 5,788,452 | A | * | 8/1998 | Brouwer et al. | 414/631 |
| 5,876,175 | A | * | 3/1999 | Braud | 414/467 |

(Continued)

FOREIGN PATENT DOCUMENTS

EP 0250018 A1 5/1987

(Continued)

OTHER PUBLICATIONS

International Search Report of PCT/IE2006/000061 dated Sep. 25, 2006, pp. 3.

*Primary Examiner*—Eric Culbreth
(74) *Attorney, Agent, or Firm*—Holland & Knight LLP; Brian J. Colandreo, Esq.; J. Mitchell Herbert, Jr., Esq.

(57) ABSTRACT

A forklift truck (10) comprising a truck body, a fork mechanism at one end of the body, and at least one wheel (18) at an opposite end of the body, said at least one wheel (18) being mounted on the body for translational movement relative to the body between a working position and a storage position.

7 Claims, 7 Drawing Sheets

U.S. PATENT DOCUMENTS

| | | | | |
|---|---|---|---|---|
| 5,879,124 | A * | 3/1999 | Brouwer et al. | 414/537 |
| 2005/0034912 | A1 | 2/2005 | Gotz | |
| 2005/0036864 | A1 * | 2/2005 | O'Keeffe | 414/467 |

FOREIGN PATENT DOCUMENTS

| | | | |
|---|---|---|---|
| EP | 0571240 | A1 | 11/1993 |
| GB | 2259292 | * | 3/1993 |
| NL | 8005192 | | 4/1982 |

* cited by examiner

FORKLIFT TRUCKS

RELATED APPLICATIONS

The subject application is a U.S. National Stage application that claims the priority of International Application No. PCT/IE2006/000061, filed on 02 Jun. 2006.

TECHNICAL FIELD

This invention relates to forklift trucks, and in particular to forklift trucks designed to be carried on another vehicle of the type generally known as "truck mounted forklifts".

BACKGROUND ART

Forklift trucks designed to be carried on the rear of a vehicle are well known. Such forklift trucks are usually stowed by securing the forks of the forklift truck to the body of the vehicle and then elevating the body of the forklift truck relative to the forks so that the forklift truck body is lifted off the ground for travel.

U.S. Pat. No. 5,482,141 describes a forklift truck of this type in which the forklift truck has an overhead chassis structure which can be converted between a working configuration and a stowage configuration. In the stowage configuration the hinged overhead chassis closes by folding and the forklift truck body length is reduced for storage and travel.

Such forklift trucks provide the advantage that the shorter body length makes the transport vehicle more stable during travel, but this is achieved by having to make the overhead chassis structure of the truck adjustable, at increased expense and with the possibility of reduced overall strength and integrity.

DISCLOSURE OF THE INVENTION

The invention provides a forklift truck comprising a truck body, a fork mechanism adapted to engage a load at one end of the body, and at least one wheel at an opposite end of the body, said at least one wheel being mounted on the body for translational movement relative to the body between a working position and a storage position.

In contrast to systems which propose folding the entire chassis the present invention achieves a reduction in truck length by retracting a rear wheel mounted at an end opposite to the forks of the truck. When the forklift truck is designed to be carried on the rear of another vehicle using the forks to mount the truck to that vehicle, the tractable wheel will normally be the rearmost protruding element of the combination. Retraction of that wheel does not significantly alter the balance of the truck but it does reduce the chance of damage to the wheel by a following or passing vehicle or when reversing.

This reduces the rear projection which in turn minimises tail swing and reduces the overall length of the transport vehicle.

Preferably, the at least one wheel is mounted on a moveable mounting member and the forklift truck further comprises retraction means for translationally moving said moveable mounting member relative to the body between said working and storage positions.

In a preferred embodiment the truck also includes a rigid chassis, wherein said retraction means is mounted on said rigid chassis for translationally moving said moveable mounting member relative to said rigid chassis.

The use of a retractable wheel on a rigid chassis demonstrates a different approach to the collapsible or foldable overhead chassis of the prior art.

Preferably, the moveable mounting member comprises a mounting plate which is slideable within a guide from a working position to a storage position.

In a preferred embodiment, the wheel is connected to said mounting plate by means of an arm to which the wheel is rotatably connected at the wheel hub, and wherein said arm is mounted by a swivel mounting to said mounting plate thereby enabling said wheel to be steered relative to the plate.

The truck preferably also includes a hub motor mounted between said arm and said hub for driving the wheel.

Preferably, said wheel is provided with a steering mechanism for rotating the plane of the wheel relative to the body and furthermore, said wheel is preferably mounted on the body with sufficient freedom to be rotated by the steering mechanism when the wheel is in its storage position by substantially 90 degrees from a normal straight-ahead position. By enabling the retraction movement to occur in combination with the rotation of the steering through 90 degrees, the wheel's rearward projection can be reduced even further.

It is particularly preferred, in this option, to rotate the steering in that direction which most reduces the extent of rearward projection. Thus where a motor or a mounting arm is mounted on one side of the wheel (causing a protrusion on that side) the wheel is preferably steered through 90 degrees to conceal that protrusion from projecting rearwardly.

BRIEF DESCRIPTION OF THE DRAWINGS

The invention will now be further illustrated with reference to the following description of embodiments thereof, given by way of example only with reference to the accompanying drawings, in which.

DETAILED DESCRIPTION OF PREFERRED EMBODIMENTS

Figure 1:
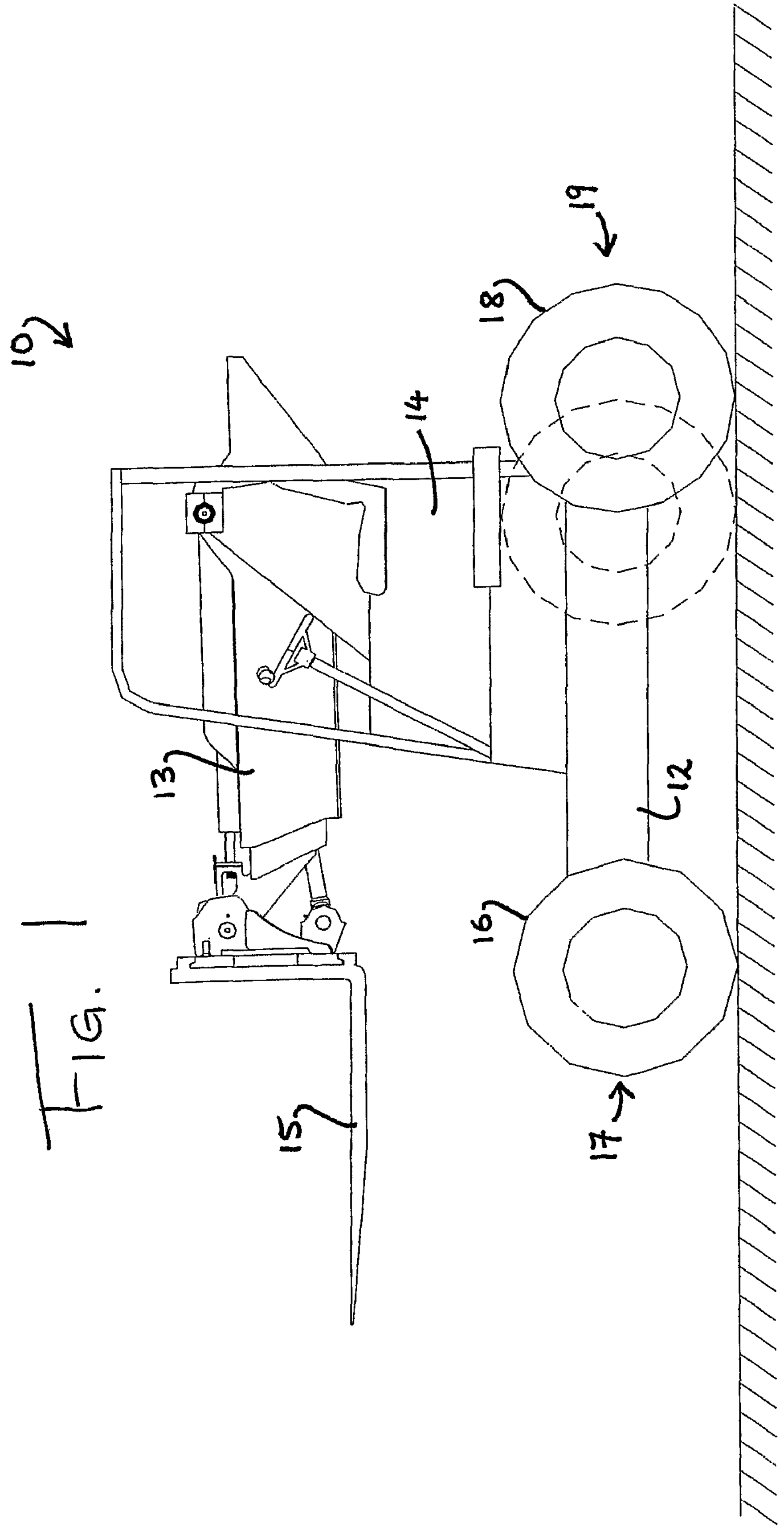
FIG. 1 is a side elevation of a forklift truck according to the invention.

FIG. 1 is a side elevation of a forklift truck, indicated generally at 10, having a chassis 12, a driver cab 14, a pair of front wheels 16 (the nearest of which can be seen in FIG. 1) at a front end of the forklift truck 10, and a single rear wheel 18 at a rear end 19 of the forklift truck 10. The driver cab is offset on one side of the front-to-rear centre line of the chassis and is situated at the side from which the view of FIG. 1 is taken. A telescopic boom 13 carrying a set of forks 15 is offset on the other side of the centre line (behind the cab in the view of FIG. 1). The forks are adapted to manipulate a load at the front end 17 of the forklift truck. This general arrangement of chassis, offset cab and offset telescopic boom is well known in the field of truck mounted forklifts.

Figure 2:
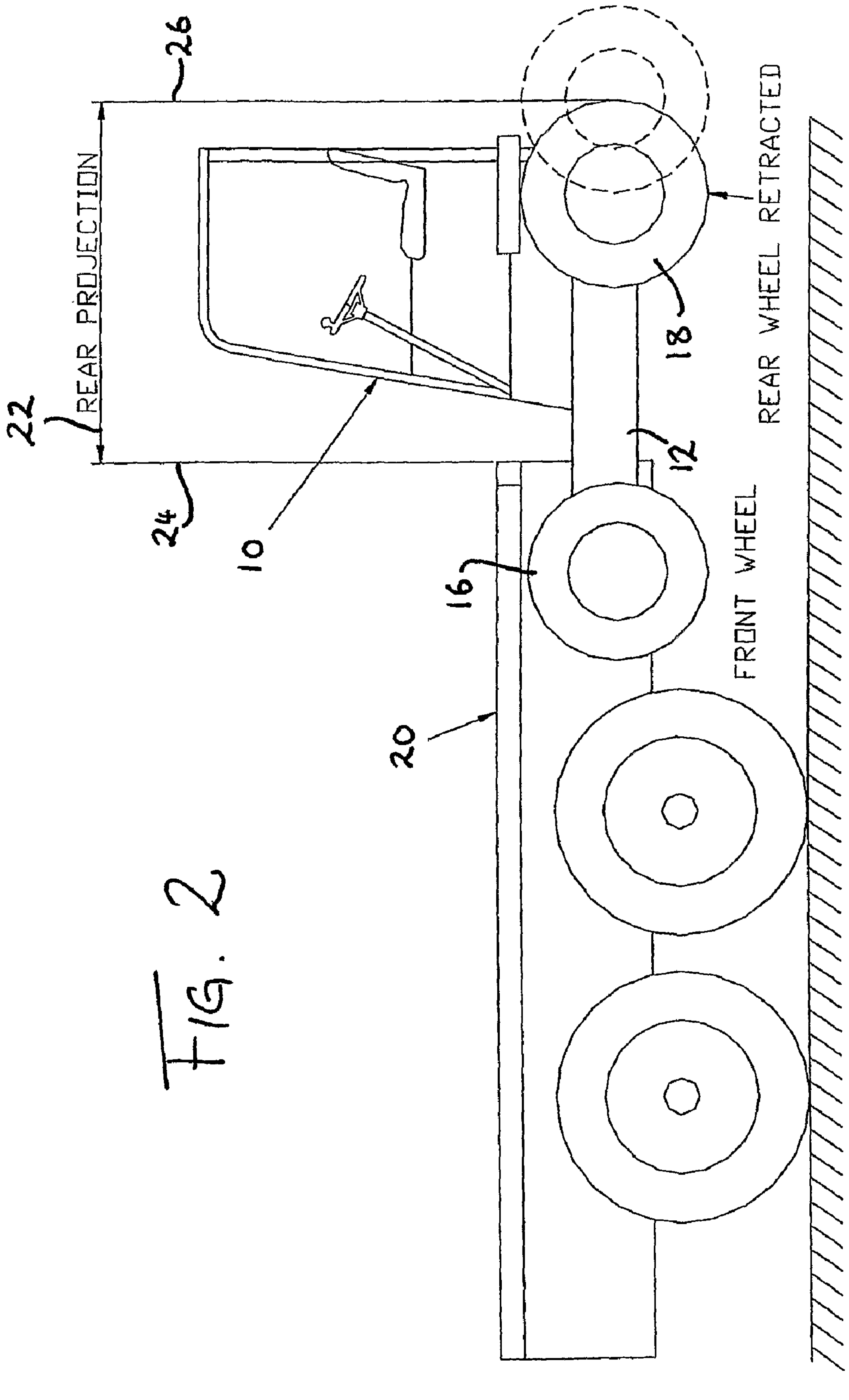
FIG. 2 is a side elevation of the truck of FIG. 1 when attached to a heavy goods vehicle.

As shown in FIG. 2, the forklift truck 10 is adapted to be coupled to and carried by a heavy goods vehicle 20. This is achieved by inserting the forks (not shown) into a receiving compartment of the heavy goods vehicle 20 and locking them in place, then activating the control to lower the forks which raises the forklift truck 10 body relative both to the forks and to the heavy goods vehicle until it reaches the position shown in FIG. 2.

In order to decrease the rear projection (which is very important in most markets), the length 22 between the rearmost point 24 of the heavy goods vehicle 20 and the rearmost point 26 of the forklift truck 10, the rear wheel 18 is extendable between a transit position and a working position.

FIG. 1 shows the rear wheel 18 in its working position (with the retracted position shown in dotted outline), while FIG. 2 shows the rear wheel 18 in its retracted position (with the working position shown in dotted outline).

Figure 3:
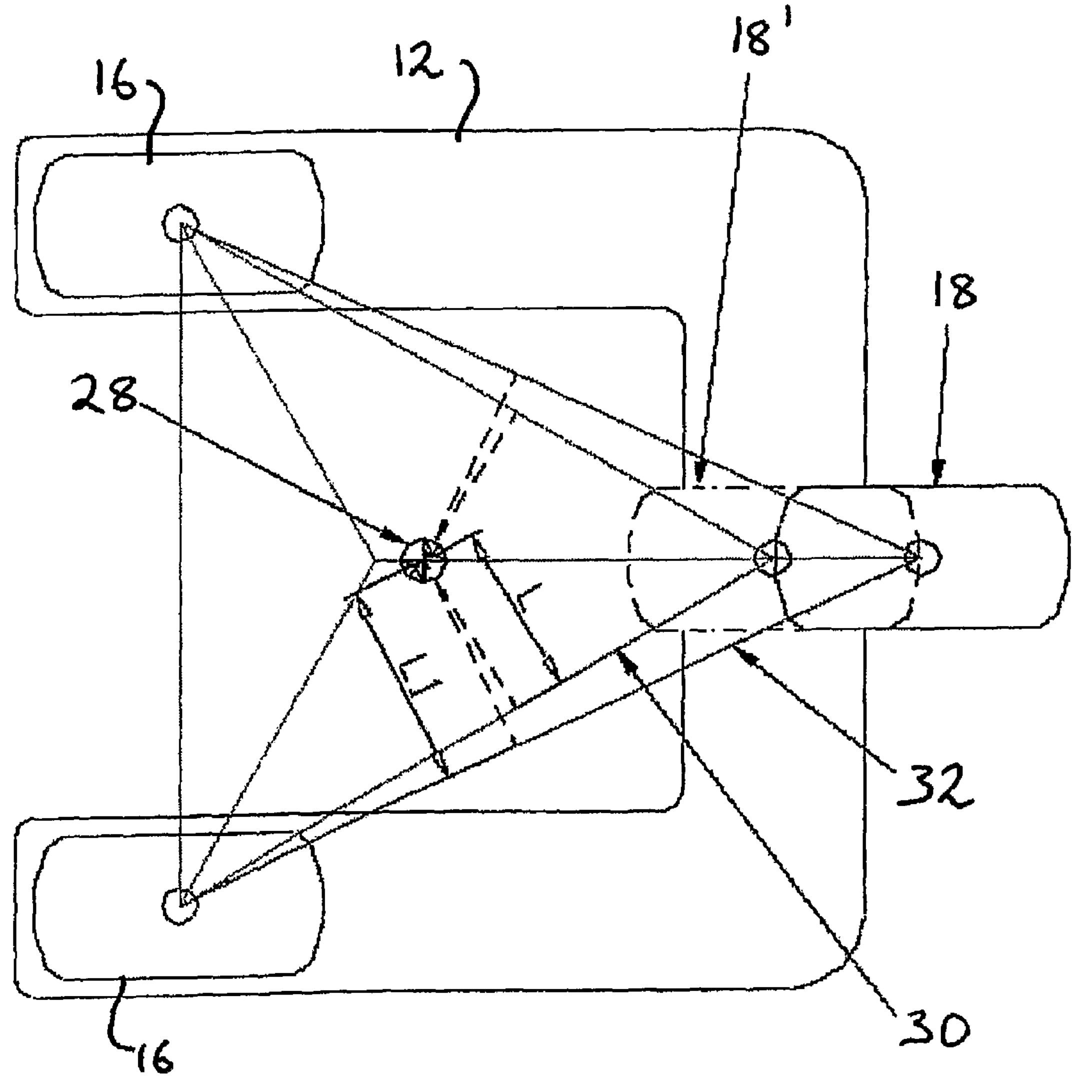
FIG. 3 is a cross sectional plan view of the truck of FIG. 1 with the wheel extended.

FIG. 3 is a plan cross sectional view of the U-shaped chassis 12 and wheels 16,18 of the truck 10. The rear wheel 18 is shown in its working position (and in dotted outline with reference numeral 18' in its transit position). The centre of gravity 28 of the truck is shown along with an inner triangle 30 connecting the centres of the three wheels when rear wheel 18' is in its transit configuration, and an outer triangle 32 connecting the centres of the wheel when rear wheel 18 is in its working position. This demonstrates that the "triangle of stability" is increased when the rear wheel is in its working position. The greater the distance the centre of gravity is from the edge of the stability triangle (L-L1) the more stable the forklift is during operation. The larger the stability triangle the more stable the forklift is during operation.

Figure 4:
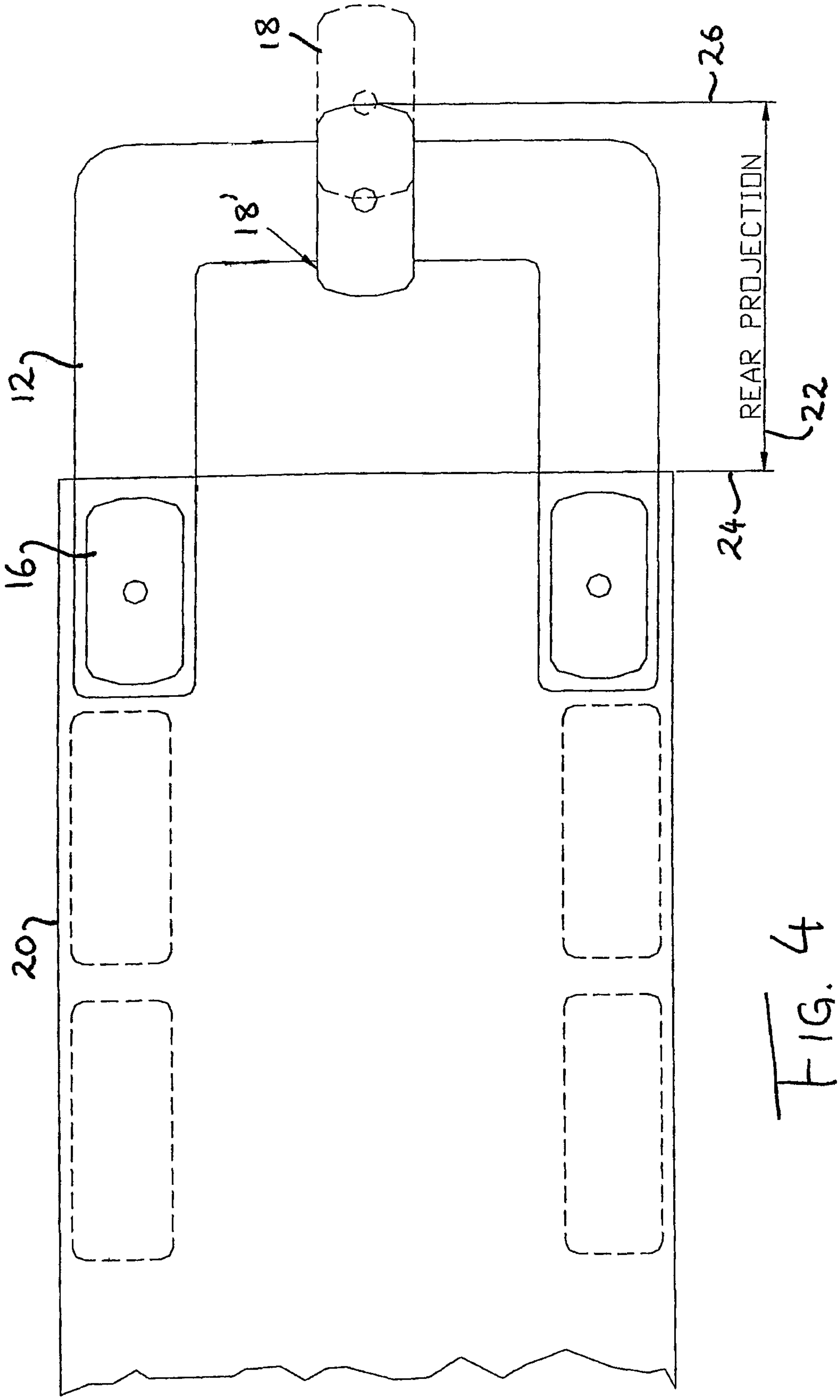
FIG. 4 is a cross sectional plan view of the truck of FIG. 2 when mounted on a heavy goods vehicle, with the wheel retracted.

FIG. 4 is cross sectional plan view of the truck when mounted on a heavy goods vehicle as shown in FIG. 2, and FIG. 4 again shows the extent of rear projection 22 when the rear wheel 18' is in its transit configuration. As will be further described below, the mechanism for retracting the wheel can be combined with a steering mechanism to turn the wheel through 90 degrees and thus move the rearmost point of projection even further forward.

Figure 5:
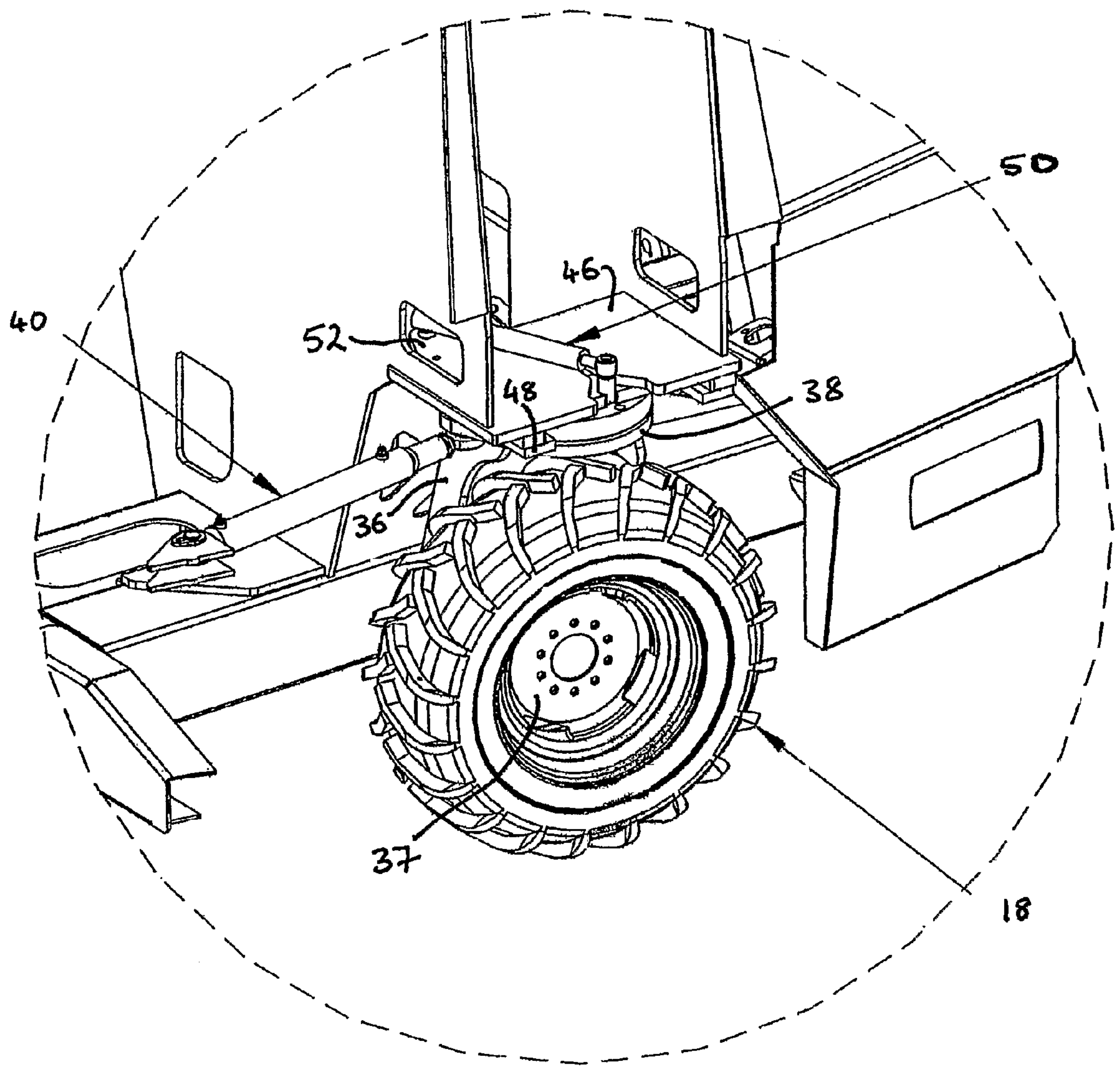
FIGS. 5-7 are perspective views of a detail of the truck of FIGS. 1-4 with the rear wheel progressively extended from a storage position to a working position.
Figure 6:
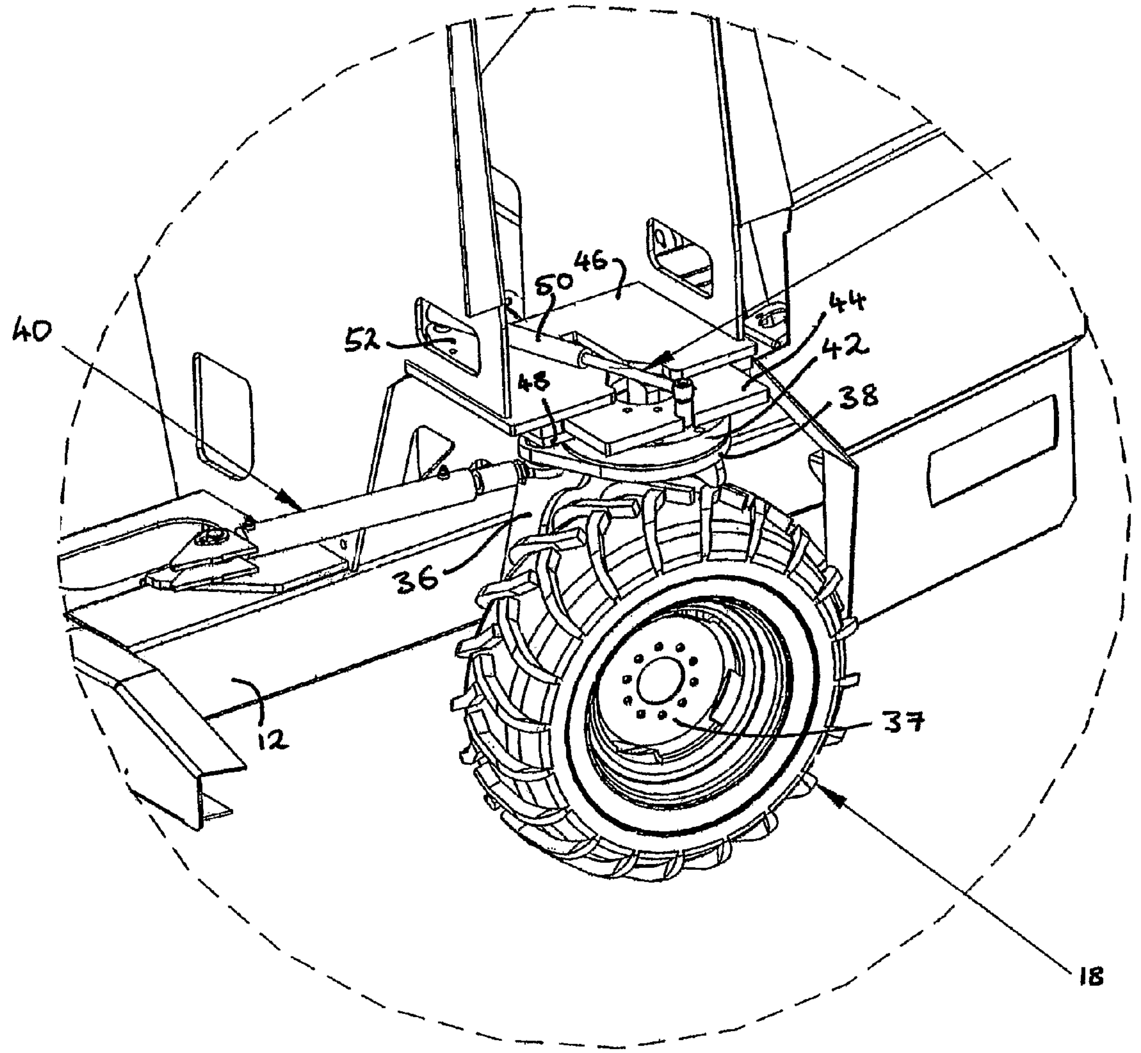
Figure 7:
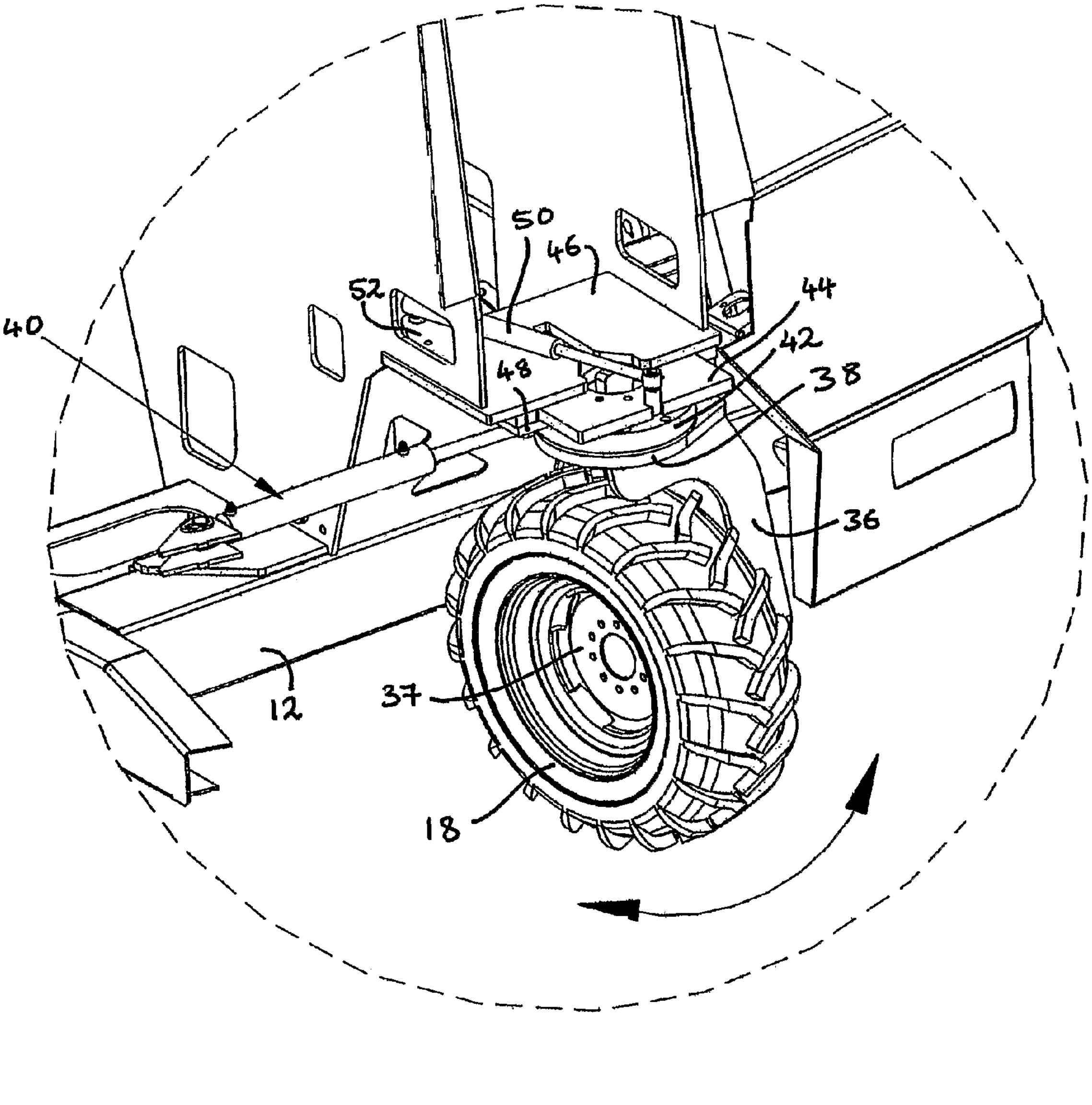

FIGS. 5, 6 and 7 provide a cutaway perspective view of the rear wheel along with its steering mechanism and the mechanism for retracting and extending the wheel between the transit and working positions.

The mechanism of FIGS. 5-7 provides an additional advantage to the general concept of retraction shown in FIGS. 1-4. Whereas the wheel in FIGS. 1-4 is simply shown as being retracted without any rotation, the mechanism shown in FIGS. 5-7 actually allows the wheel not only to be retracted but also to be rotated by 90 degrees so that the radial plane of the wheel is parallel to the back of the forklift truck. Because the rear wheel is prevented from protruding outwards along the common longitudinal axis of the heavy goods vehicle and forklift truck, the overall length is decreased further.

FIG. 5 shows the wheel retracted and rotated into its transit position. FIG. 6 shows the wheel extended outward to the working position but still rotated parallel to the back of the forklift truck. FIG. 7 shows the wheel in its working position, after it has been rotated so that the radial plane of the wheel is parallel to the direction of normal movement of the truck when steering straight ahead.

As best seen in FIG. 7, the wheel 18 is carried on an arm 36 which mounts the hub 37 of the wheel. A hydraulic motor (not visible) is integral with the hub and a hydraulic feed to that motor provides the driving mechanism for the wheel. The arm 36 terminates at its top end at a top plate 38 which is rotatable about a vertical axis by means of a hydraulic linkage 40 (see FIGS. 5 and 6). Hydraulic linkage 40 provides the steering mechanism for rotating the wheel 18 relative to the chassis 12. This hydraulic linkage is functionally linked to the steering wheel in the driver's cab.

The top plate 38 of arm 36 is rotatably mounted on an orbital mounting plate 42, so actuation of the hydraulic linkage 40 causes top plate 38 and orbital mounting plate 42 to rotate relative to one another. Orbital mounting plate 42 is prevented from rotation relative to the chassis by being mounted on a sliding plate 44. Sliding plate 44 is slideably received between a pair of horizontal plates 46,48 which in turn are mounted on the chassis structure. Thus, plate 44 can slide back and forth to move the wheel between the retracted position shown in FIG. 5 and the working position shown in FIGS. 6 and 7. Once the wheel is in the position shown in FIG. 6, the hydraulic steering linkage 40 rotates the wheel about its vertical axis to the position shown in FIG. 7.

A hydraulic retraction arm 50 controls this back and forth sliding movement. Hydraulic retraction arm 50 provides a linkage between a mounting point 52 connected to the chassis structure at one end, and the orbital mounting plate 42 and sliding plate 44 at the other end. A control (not shown) in the driver's cab actuates the hydraulic retraction arm 50 to retract or extend sliding plate 44 (and hence the wheel) between the positions of FIG. 5 and FIG. 6.

The embodiment described above can be varied or modified as appropriate without departing from the scope of the claimed invention, including, in particular, by providing more than one rear wheel, provided that the rearmost wheel or wheels is retractable from a working position to a storage position in which the overall length of the truck is decreased.

The invention claimed is:

1. A forklift truck comprising:

a truck body, a fork mechanism adapted to engage a load at one end of the body, and at least one wheel at an opposite end of the body, said at least one wheel being mounted on the body for translational movement relative to the body between a working position and a storage position;

the at least one wheel is mounted on a moveable mounting member and the forklift truck further comprises a retraction arm for translationally moving said moveable mounting member relative to the body between said working and storage positions;

the forklift truck further comprising a rigid chassis, wherein said retraction arm is mounted on said rigid chassis for translationally moving said moveable mounting member relative to said rigid chassis;

said moveable mounting member comprising a mounting plate which is slidable within a guide from the working position to the storage position; and said wheel is connected to said mounting plate by means of an arm to which the wheel is rotatably connected at the wheel hub, and wherein said arm is mounted by a swivel mounting to said mounting plate thereby enabling said wheel to be steered relative to the plate.

2. The forklift truck as claimed in claim 1, further comprising a hub motor mounted between said arm and said hub for driving the wheel.

3. The forklift truck as claimed in claim 1 wherein said wheel is provided with a steering mechanism for rotating a plane of the wheel relative to the body and wherein said wheel is mounted on the body with sufficient freedom to be rotated by the steering mechanism when the wheel is in its storage position by substantially 90 degrees from a normal straight-ahead position.

4. A forklift truck comprising:

a truck body, a fork mechanism adapted to engage a load at one end of the body, and at least one wheel at an opposite end of the body, said at least one wheel being mounted on the body for translational movement relative to the body between a working position and a storage position;

the at least one wheel being mounted on a moveable mounting member and the forklift truck further comprises a retraction arm for translationally moving said moveable mounting member relative to the body between said working and storage positions;

wherein said moveable mounting member comprises a mounting plate which is slidable within a guide from the working position to the storage position;

said wheel is connected to said mounting plate by means of an arm to which the wheel is rotatably connected at the wheel hub, and wherein said arm is mounted by a swivel mounting to said mounting plate thereby enabling said wheel to be steered relative to the plate.

5. The forklift truck as claimed in claim 4, further comprising a hub motor mounted between said arm and said hub for driving the wheel.

6. A forklift truck for mounting on the rear of a carrying vehicle comprising:

a U-shaped chassis comprising a rear leg bridged by a pair of forwardly projecting side legs;

a fork mechanism adapted to engage a load mounted on the chassis between the side legs;

a plurality of ground engaging wheels mounted on the chassis, said ground engaging wheels including a rear wheel located adjacent the rear of the forklift truck and mounted for translational movement forwards and backwards relative a longitudinal axis of the body between a working position and a storage position;

said rear wheel being mounted on a moveable mounting member and the forklift truck further comprises a retraction arm for translationally moving said moveable mounting member relative to the body between said working and storage positions;

wherein said moveable mounting member comprises a mounting plate which is slidable within a guide from the working position to the storage position; and wherein said rear wheel is connected to said mounting plate by means of an arm to which the wheel is rotatably connected at the wheel hub, and wherein said arm is mounted by a swivel mounting to said mounting plate thereby enabling said wheel to be steered relative to the plate.

7. The forklift truck as claimed in claim 6, further comprising a hub motor mounted between said arm and said hub for driving the wheel.

* * * * *